United States Patent [19]

Onishi et al.

[11] 4,440,852

[45] Apr. 3, 1984

[54] SILVER HALIDE PHOTOGRAPHIC LIGHT-SENSITIVE MATERIAL CONTAINING OXONAL DYES

[75] Inventors: Akira Onishi, Hachioji; Noboru Fujimori, Hino, both of Japan

[73] Assignee: Konishiroku Photo Industry Co., Ltd., Tokyo, Japan

[21] Appl. No.: 388,131

[22] Filed: Jun. 14, 1982

[30] Foreign Application Priority Data

Jun. 25, 1981 [JP] Japan .................................. 56-99349

[51] Int. Cl.³ .............................................. G04C 1/84
[52] U.S. Cl. .................................... 430/522; 430/517; 548/364
[58] Field of Search ............... 430/522, 510, 517, 595; 542/444

[56] References Cited

U.S. PATENT DOCUMENTS

| | | | |
|---|---|---|---|
| 3,795,519 | 3/1974 | Miyazako et al. | 430/522 |
| 3,984,246 | 10/1976 | Ohischlager et al. | 430/522 |
| 4,259,493 | 3/1981 | Foley | 430/517 |
| 4,266,014 | 5/1981 | Moelants et al. | 430/522 |
| 4,288,534 | 9/1981 | Lemahieu et al. | 430/522 |

*Primary Examiner*—Jack P. Brammer
*Attorney, Agent, or Firm*—Finnegan, Henderson, Farabow, Garrett & Dunner

[57] ABSTRACT

The present invention relates to a silver halide photographic light-sensitive material, and particularly to a silver halide photographic light-sensitive material containing a hydrophilic colloidal layer dyed by a dye useful as a light-absorbing dye.

4 Claims, No Drawings

SILVER HALIDE PHOTOGRAPHIC LIGHT-SENSITIVE MATERIAL CONTAINING OXONAL DYES

BACKGROUND OF THE INVENTION

In silver halide photographic light-sensitive materials, it is well known that dyes are incorporated into silver halide photographic light-sensitive materials for the purpose of absorbing the light in a specific wavelength region to fulfill filtering, antihalation and antiirradiation effects, and these dyes are used to dye hydrophilic layers.

A filter layer is usually located on top of light-sensitive emulsion layers or between emulsion layers to serve for converting an incident light reaching the emulsion layer into a light having a desirable spectral composition. And for the purpose of improving the sharpness of a photographic image, such expedients are commonly used that an antihalation layer is provided between an emulsion layer and the support thereof or on the back of the support to absorb an undesirable light reflecting from the interface between the emulsion layer and the support or from the back of the support to fulfill an antihalation effect, or an emulsion layer is dyed to absorb an undesirable light reflected or scattered by the silver halide particles to fulfill an antiirradiation effect.

Those dyes to be used for such purposes should meet such requirements that they have satisfactory absorption spectral characteristics according to uses; be completely decolored during the photographic development or readily dissolved out of the silver halide photographic light-sensitive material and do not stain the material with the residual dye after processing; do not have any such a bad influence as fog or desensitization upon the photographic emulsion; do not diffuse from the dyed layer into other layers; and be excellent in stability, i.e., not discolored, in a solution or in the silver halide photographic light-sensitive material.

DESCRIPTION OF THE PRIOR ART

To date, a number of attempts have been made to find dyes which satisfy the above-described requirements and thus a large variety of dyes have been proposed: for example, oxonol dyes as disclosed in, e.g., British Pat. No. 506,385, German Pat. No. 2,117,346, U.S. Pat. No. 3,247,127, Japanese Patent Examined Publication No. 22069/1964, and Japanese Patent Publication Open to Public Inspection (hereinafter referred to as Japanese Patent O.P.I. Publication) No. 120660/1980, styryl dyes as disclosed in U.S. Pat. No. 1,845,404, merocyanine dyes as disclosed in U.S. Pat. No. 2,493,747, cyanine dyes as disclosed in U.S. Pat. No. 2,843,486, and the like. However, it is the fact that there exist little satisfactory dyes which meet all the foregoing requirements and are applicable to silver halide photographic light-sensitive materials.

SUMMARY OF THE INVENTION

It is an object of the present invention to provide a silver halide photographic light-sensitive material containing a dye which has satisfactory absorption spectral characteristics, is decolored completely during photographic development so that little or no dye remains after the processing, and is inert to the silver halide photographic light-sensitive material.

DETAILED DESCRIPTION OF THE INVENTION

Such the object of the present invention has been attained by incorporating into a silver halide photographic light-sensitive material a novel oxonol dye having the formula:

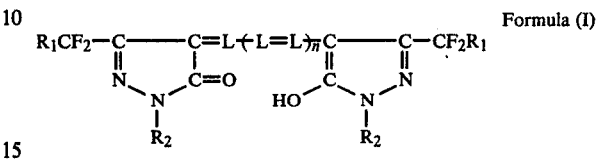

Formula (I)

wherein $R_1$ is hydrogen, fluorine, or a fluorinated alkyl group having from 1 to 4 carbon atoms (such as difluoromethyl, trifluoromethyl, 1,1,2,2,3,3-hexafluoropropyl group, etc.); $R_2$ is hydrogen, an alkyl group (such as methyl, ethyl, propyl, butyl, hexyl, octyl, dodecyl, etc.), or an aryl group (such as phenyl, naphthyl, etc.), the alkyl or the aryl represented by $R_2$ being allowed to be substituted further by hydroxyl, amino, a halogen (such as fluorine, chlorine, bromine, etc.), an alkoxy (such as methoxy, ethoxy, etc.), carboxy, carbamoyl, sulfo, sulfamoyl, aryl (such as phenyl, 4-sulfophenyl, etc.), aryloxy (such as phenoxy, 4-sulfophenoxy, etc.), or the like, said carboxy or sulfo group being permitted to form salt with metal atom, said aryl group being permitted to be further substituted by an alkyl having from 1 to 4 carbon atoms (such as methyl, ethyl, etc.); n is an integer of 0, 1 or 2; and L is methine group which may be substituted by an alkyl (such as methyl, ethyl, etc.), aryl (such as phenyl), or the like.

In the present invention, it is particularly desirable to use an oxonol dye having at least one sulfo group or carboxy group in the molecule thereof, said oxonol dye having the formula:

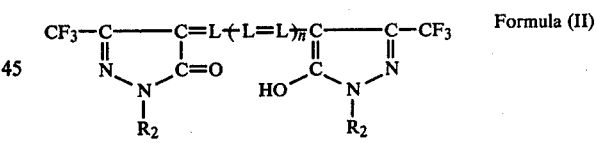

Formula (II)

wherein $R_2$, n and L are as defined in Formula (I)

The following are typical examples of oxonol dyes having Formula (I), but the oxonol dyes of the present invention are not limited to the following examples:

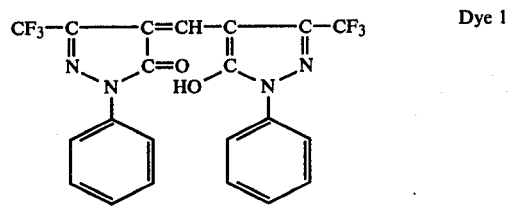

Dye 1

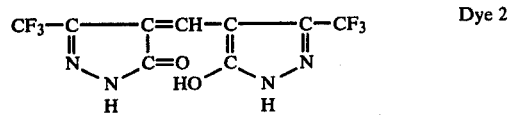

Dye 2

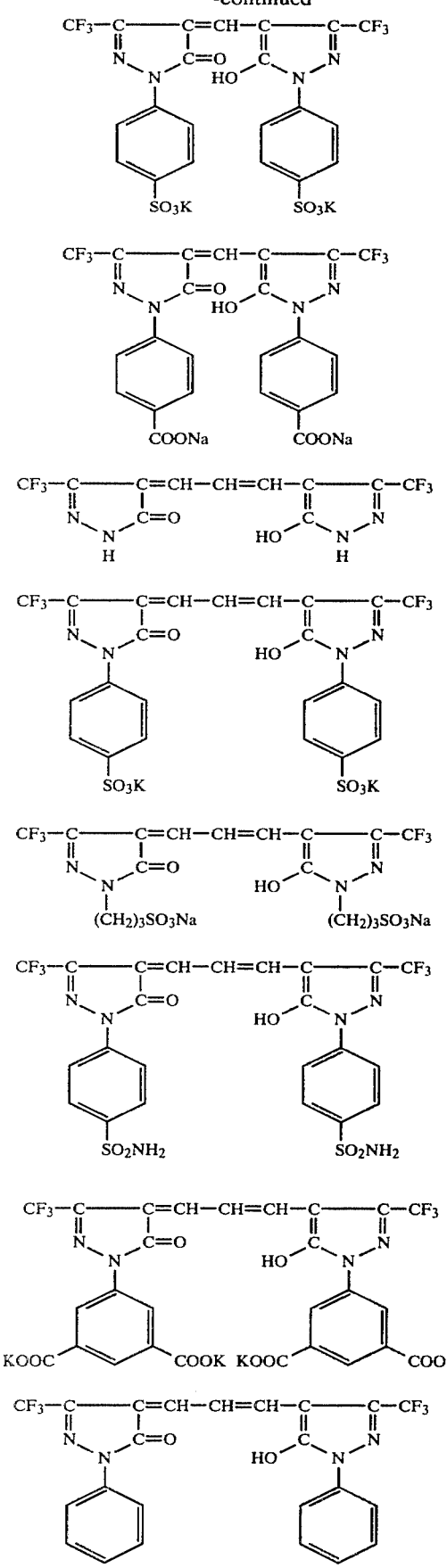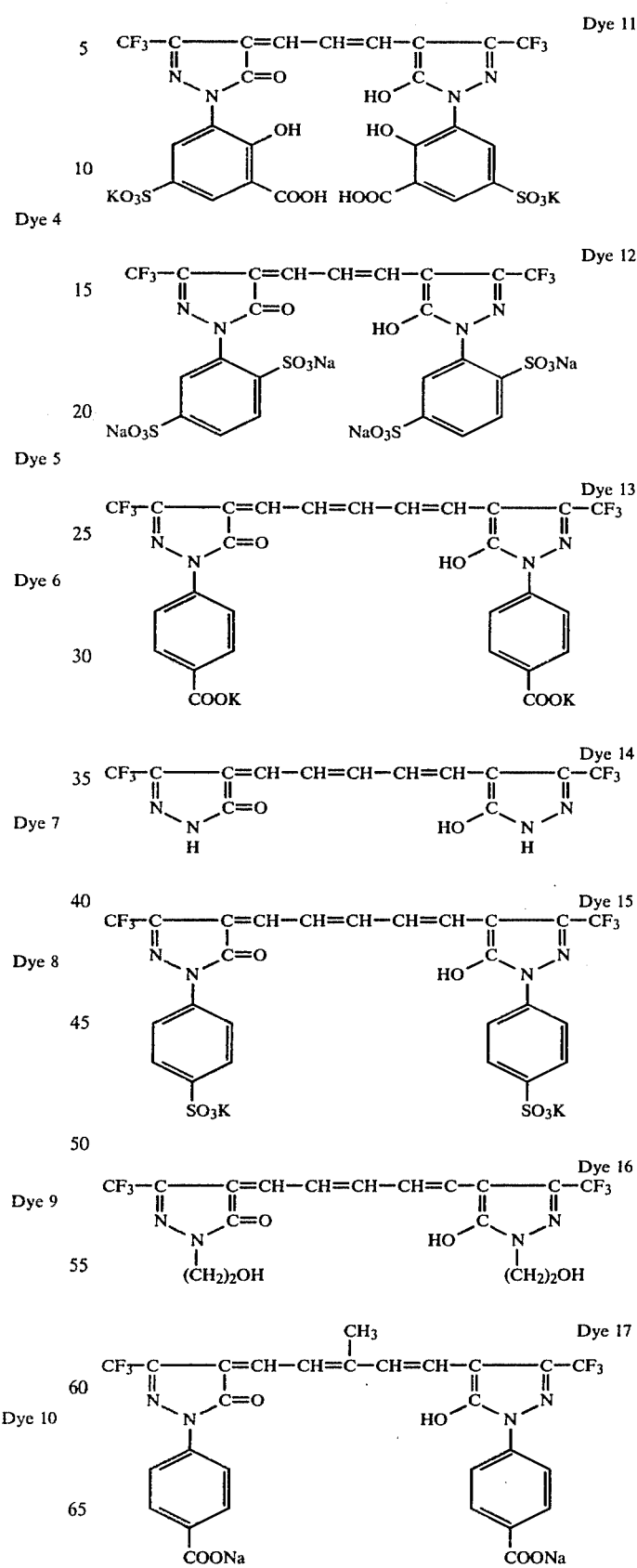

-continued

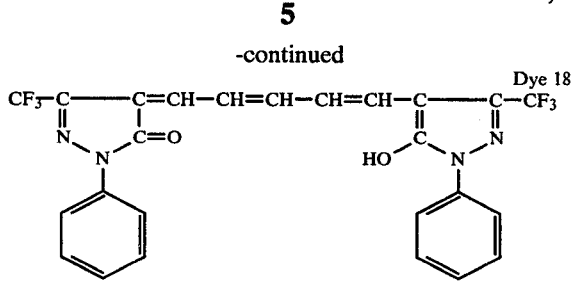
Dye 18

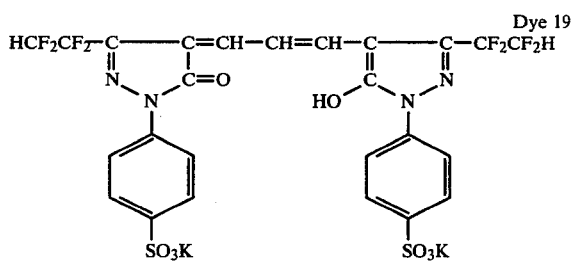
Dye 19

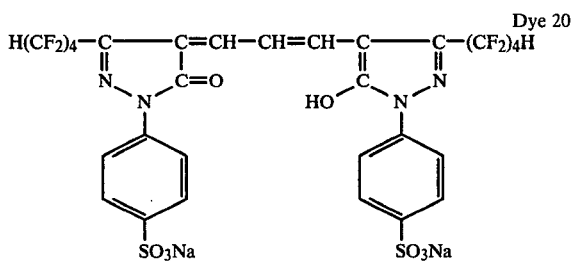
Dye 20

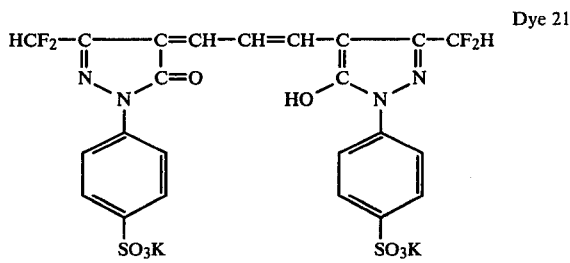
Dye 21

Those dyes intended for use in the silver halide photographic light-sensitive material of the present invention may be produced in normal manners. For example, a 3-trifluoromethyl pyrazolone and an appropriate methine chain doner are condensed in the presence of a base to synthesize mono-, tri- and penta-methine oxonols. Some of 3-trifluoromethyl pyrazones are described in Journal of American Chemical Society, vol. 68, p426 (1946), which may be readily synthesized by the condensation reaction of a trifluoroacetoacetate with a necessary hydrazine derivative. Synthesis examples of typical compounds among these dyes are given below:

SYNTHESIS EXAMPLE 1

(Synthesis of Dye 3)

1.85 g of 1-sulfophenyl-3-trifluoromethyl-5-pyrazolone and 1.35 g of ethyl orthoformate were added to 30 ml of acetic anhydride, and to the mixture, with heating, were added 1.25 g of potassium acetate to effect the reaction of the mixture at 100° C. for 15 minutes. After cooling, precipitated dyes were filtrated to obtain and were fully cleaned with ethanol, thus the object of 1.05 g was obtained. The λmax of an aqueous solution of the resulting dye was 454 nm.

SYNTHESIS EXAMPLE 2

(Synthesis of Dye 5)

1.82 g of 3-trifluoromethyl-5-pyrazolone and 1.33 g of propene dianyl were added to 40 ml of ethanol, to which were further added 2.43 g of triethylamine and the mixture was refluxed with heating for one hour. After distilling off the ethanol, the reaction product was refined by silica gel chromatography to thereby obtain 1.28 g of an objective product. The λmax of a methanol solution of the resulting dye was 538 nm.

SYNTHESIS EXAMPLE 3

(Synthesis of Dye 6)

2.16 g of 1-sulfophenyl-3-trifluoro-5-pyrazolone and 0.78 g of propene dianyl were added to 50 ml of ethanol, to which were further added 1.42 g of triethylamine and the mixture was refluxed with heating for two hours. To this was further added a solution of 2 g of potassium acetate dissolved into 20 ml of methanol and the mixture was further refluxed for 5 minutes. The deposited dye was filtrated, washed sufficiently with ethanol, and then dried, whereby 1.50 g of an objective product were obtained. The λmax of an aqueous solution of the resulting dye was 538 nm.

SYNTHESIS EXAMPLE 4

(Synthesis of Dye 10)

1.14 g of 1-phenyl-3-trifluoromethyl-5-pyrazolone and 0.56 g of propene dianyl were dissolved into 20 ml of ethanol, to which were added 1.01 g of triethylamine, and the mixture was refluxed with heating for one hour. After distilling off the ethanol, the resulting product was refined by silica gel chromatography, thereby obtaining 0.60 g of an objective product. The λmax of a methanol solution of the dye was 546 nm.

In the silver halide photographic light-sensitive material of the present invention, an oxonol dye having Formula (I) may be used as an antiirradiation dye by being incorporated into the silver halide photographic light-sensitive emulsion, and may also be used as a filter dyes or an antihalation dye by being incorporated into a non-light-sensitive, hydrophilic colloidal layer. And such dyes may be used in combination of not less than two kinds thereof or in combination with other different dyes if necessary. The incorporation of a dye of the present invention into the silver halide photographic light-sensitive emulsion or into a hydrophilic colloidal layer may be readily carried out in a normal manner. In general, a dye may be incorporated into a silver halide photographic light-sensitive material in such a manner that a dye or an organic or inorganic alkaline salt of a dye is dissolved into water or an organic solvent (such as alcohols, glycols, cellosolves, dimethyl formaldehyde, dibutyl phthalate, tricresyl phosphate, etc.), if necessary, emulsified to be dispersed, and added to a coating liquid to be coated. The dye content of the emulsion depends upon applications, but it is usually within the range of from 1.0 to 1,000 mg per m² of coating of the emulsion of a light-sensitive material.

For the support for the silver halide photographic light-sensitive material of the present invention there may be used such a material as a polyester polyolefin such as cellulose acetate, cellulose nitrate, polyethylene terephthalate, or the like, polyolefin such as polyethylene, polystyrene, baryta paper, polyolefin-coated paper, glass, a metal, or the like.

Hydrophilic colloids intended for use in the silver halide photographic light-sensitive material of the present invention include gelatin, gelatin derivatives such as phthalated gelatin, benzene-sulfonated gelatin, and the like, water-soluble natural macromolecular materials such as agar, casein, alginic acid, and the like, synthetic resins such as polyvinyl alcohols, polyvinyl pyrolidones, and the like, and cellulose derivatives such as carboxymethyl cellulose, these materials being allowed to be used singly or in combination.

Those silver halide emulsions applicable to the silver halide photographic light-sensitive material of the present invention include silver chloride, silver bromide, silver iodide, silver chlorobromide, silver iodobromide, silver chloroiodobromide, and the like. These emulsions may be sensitized in known manners by the use of sulfur compounds, noble metal sensitizers or polyalkylene oxide derivatives. And these emulsions may also contain such spectral sensitizers as cyanine dyes, hemicyanine dyes, merocyanine dyes, oxonol dyes, styryl dyes, and the like.

Further, the silver halide photographic light-sensitive material of the present invention is allowed to contain such a mordant as a polymer having amino or ammonium group, a polymer having a nitrogen-containing heterocyclic ring, or the like, and in addition, such commonly usable additives for photographic materials as a hardener, coating aid, stabilizer, ultraviolet absorbing agent, brightening agent, antistatic agent, and the like, and further, colored couplers and the dispersing agent therefor, development inhibitor compounds, and the like.

The oxonol dyes of the present invention are distinguished from those known oxonol dyes in respect that the former have —CF$_2$R$_1$ group in the third position of pyrazolone, and have such advantages that they have satisfactory absorption spectral characteristics; are decolored during photographic processing to give little or no residual color stain after the processing; and have no bad influence upon the emulsion.

The present invention is illustrated in further detail with reference to examples below, but the present invention is not limited thereto:

EXAMPLE 1

3.5 g of gelatin was dissolved into 35 ml of distilled water, and to the gelatin solution were added separate solutions containing Dyes (5), (6) and (11) in the quantity of $2.0 \times 10^{-4}$ mol, respectively (a 5 ml methanol solution of Dye (5) containing several drops of triethylamin, and two 5 ml aqueous solutions containing Dyes (6) and (11), respectively), 1.25 ml of a 10% aqueous saponin solution, and 0.75 ml of a 1% formalin solution. Finally water was added to the resulting solution to make the whole amount 50 ml. Each dye solution was coated on an acetyl cellulose support and dried to thereby prepare samples (I), (II) and (III). On the other hand, the following known dyes A and B were used in place of the dyes of the present invention to prepare control samples (IV) and (V) in like manner.

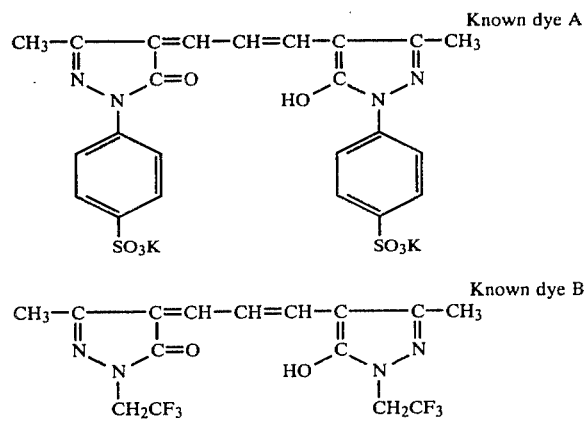

These samples each was immersed in a developer solution of the following composition for 15 minutes at 25° C., washed for 20 seconds, and then dried. Measurements were made for visible spectra of the samples before and after the immersion in the developer solution, and decoloration rates were determined from their optical densities in the maximum absorption wavelengths. The results and the maximum absorption wavelengths in the gelatin are as shown in Table 1.

$$\text{Decoloration rate} = \frac{D_1 - D_2}{D_1} \times 100 \, (\%)$$

($D_1$ represents the density before the immersion, while $D_2$ after the immersion)

| Composition of the developer solution used: | |
|---|---|
| Metol | 3.0 g |
| Sodium sulfite | 45.0 g |
| Hydroquinone | 12.0 g |
| Sodium carbonate, monohydrated | 80.0 g |
| Potassium bromide | 2.0 g |
| Water to make 1 liter | |

TABLE 1

| Sample | Dye | Absorption max wavelength in gelatin | Decoloration rate (%) |
|---|---|---|---|
| I | Dye of the invention (5) | 548 (nm) | 97 |
| II | Dye of the invention (6) | 550, 522 (nm) | 100 |
| III | Dye of the invention (11) | 551, 523 (nm) | 100 |
| IV | Known dye A | 535 (nm) | 93 |
| V | Known dye B | 522 (nm) | 93 |

As apparent from Table 1, the dyes of the present invention were found out to have excellent decoloring nature as compared to known dyes A and B. In addition, from the results of Dye (5) of the present invention, it was found out that even those dyes containing no water-soluble group like sulfo group can be completely decolored.

EXAMPLE 2

An acetyl cellulose support was provided thereon with:

as the first layer, a blue-sensitive emulsion layer (silver iodobromide containing 7 mol% silver iodide) containing an yellow coupler α-pivalyl-α-(1-benzyl-2-phenyl-3,5-dioxotriazolidine-4-yl)-2'-chloro-5'-[γ(2,4-di-t-amyl phenoxy)butylamide]acetanilide;

as the second layer, a gelatin layer;

as the third layer, a green-sensitive emulsion layer (a silver chlorobromide containing 30 mol% silver bromide) containing magenta coupler 1-(2,4,6-trichlorophenyl)-3-[3-(2,4-di-t-amyl phenoxyacetamide)benzamide]-5-pyrazolone;

as the fourth layer, a gelatin layer;

as the fifth layer, a red-sensitive emulsion layer (a silver chlorobromide containing 30 mol% silver bromide) containing a cyan coupler 2,4-di-chloro-3-methyl-6-(2,4-di-t-amyl phenoxyacetamide) phenol; and as the sixth layer, a gelatin layer;

thus preparing a multilayered color film (sample VI).

On the other hand, two green-sensitive emulsions prepared by adding separate 2% aqueous solutions of Dye (6) in the present invention and of known dye C in the quantity of 240 ml per kg of the respective emulsions were used to prepare sample VII for the dye of the present invention and sample VIII as control, respectively, in quite the same manner as in the above sample.

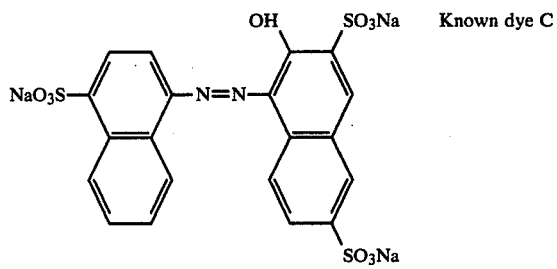

Known dye C

Each of the samples VI, VII and VIII was exposed to light and then processed in the following processing steps:

| Processing steps at 31° C. | Period |
|---|---|
| 1. Color development | 3 min. 30 sec. |
| 2. Bleach-fixing | 1 min. 30 sec. |
| 3. Washing | 1 min. 30 sec. |
| 4. Stabilizing | 30 sec. |
| 5. Washing | 30 sec. |

Compositions of the processing solutions used in the respective processing steps are as follows:

| Color developer solution: | |
|---|---|
| 4-amino-3-methyl-N—ethyl-N—(β-hydroxyethyl)-aniline sulfate | 4.8 g |
| Anhydrous sodium sulfite | 4.0 g |
| Hydroxylamine ½ sulfate | 2.0 g |
| Anhydrous potassium carbonate | 28.0 g |
| Potassium bromide | 1.5 g |
| Potassium hydroxide | 1.0 g |
| Water to make 1 liter | |

| Bleach fixing solution: | |
|---|---|
| Iron ethylenediamine tetraacetate | 65.0 g |
| Disodium ethylenediamine tetraacetate | 3.0 g |
| Anhydrous sodium sulfite | 9.5 g |
| Ammonium thiosulfate | 77.5 g |
| Anhydrous sodium carbonate | 4.0 g |

| Bleach fixing solution: |
|---|
| Water to make 1 liter |

| Stabilizer solution: | |
|---|---|
| Glacial acetic acid | 9 ml |
| Sodium acetate | 3.0 g |
| Water to make 1 liter | |

The densities of the unexposed areas of the respective samples after the processing are as shown in Table 2.

TABLE 2

| | | Densities of unexposed area | | |
|---|---|---|---|---|
| Sample | Dye | Blue density | Green density | Red density |
| VI | none | 0.06 | 0.05 | 0.04 |
| VII | Dye of the invention (6) | 0.06 | 0.05 | 0.04 |
| VIII | Known dye C | 0.06 | 0.08 | 0.04 |

The sensitivities of the respective samples when the sensitivities to blue, green and red of sample VI that contains no dye are regarded as 100, respectively, are shown in Table 3.

TABLE 3

| | | Relative sensitivity | | |
|---|---|---|---|---|
| Sample | Dye | to blue | to green | to red |
| VI | none | 100 | 100 | 100 |
| VII | Dye of the invention (6) | 82 | 70 | 94 |
| VIII | Known dye C | 69 | 61 | 93 |

As apparent from Table 2 and Table 3, the sample containing the dye of the invention showed no such a dye stain by the residual dye as recognized in another sample containing the known dye. And the dye of the invention was found out to have little or no bad influence upon the emulsion.

EXAMPLE 3

On a polyethylene-coated paper support were coated in order from the support side the following layers to thereby prepare a multilayered color photographic light-sensitive material (sample IX):

The first layer: a blue-sensitive silver halide emulsion layer (a silver chlorobromide emulsion containing 90 mol% silver bromide) containing an yellow coupler α-pivalyl-α-(1-benzyl-2,4-dioxoimidazolidine-3-yl)-2'-chloro-5'-[γ-(2,4-di-t-amyl phenoxy)propylamide]acetanilide, a hardener (dichlorotriazine) and a surfactant (saponin) was coated so that the coating silver amount becomes 3.5 mg/100 cm².

The second layer: a gelatin layer (an interlayer).

The third layer: a green-sensitive silver halide emulsion layer (a silver chlorobromide emulsion containing 80 mol% silver bromide) containing a magenta coupler 1-(2,4,6-trichlorophenyl)-3-{[2-chloro-5-(2,5-di-oxo-3-octadesenyl pyrolidine-1-yl]anilino}-5-pyrazolone, a hardener (dichlorotriazine) and a surfactant (saponin) was coated so that the coating silver amount becomes 4.5 mg/100 cm².

The fourth layer: a gelatin layer (an interlayer).

The fifth layer: a red-sensitive silver halide emulsion layer (silver chlorobromide emulsion containing 75 mol% silver bromide) containing a cyan coupler 2,4-dichloro-3-methyl-6-(2,4-di-t-amyl phenoxyacetamide) phenol, a hardener (dichlorotriazine), and a surfactant (saponin) was coated so that the coating silver amount becomes 2.0 mg/100 cm$^2$.

The sixth layer: a gelatin layer (a protective layer).

On the other hand, two green-sensitive emulsions (for the third layers) prepared separately by adding 2% aqueous solutions of Dye (6) in the invention and of known dye D, respectively, in the quantity of 200 ml per kg of the respective emulsions, and two red-sensitive emulsions (for the fifth layers) prepared separately by adding 2% aqueous solutions of Dye (15) in the invention and of known dye E, respectively, in the quantity of 200 ml per kg of the respective emulsions were coated in the same manner as in the above-described sample IX to thereby produce sample X containing Dye (6) and Dye (15) and sample XI containing known dye D and known dye E.

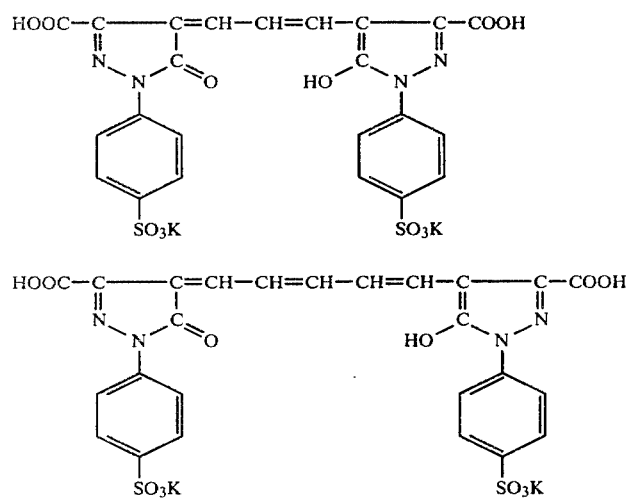

Known dye D

Known dye E

Each of these samples IX, X and XI was exposed to light and then processed in the following processing steps:

| Processing steps at 31° C. | Period |
|---|---|
| 1. Color development | 3 min. 30 sec. |
| 2. Bleach fixing | 1 min. 30 sec. |
| 3. Washing | 2 min. |
| 4. Stabilizing | 30 sec. |
| 5. Washing | 2 min. |

The processing solutions used herein are identical with those used in Example 2.

The densities of the unexposed areas of the respective samples after the processing are as shown in Table 4.

TABLE 4

| | | Densities of unexposed area | | |
|---|---|---|---|---|
| Sample | Dye | Blue density | Green density | Red density |
| IX | None | 0.05 | 0.05 | 0.03 |
| X | Dyes (6) & (15) of the invention | 0.05 | 0.05 | 0.03 |
| XI | Known dyes D & E | 0.05 | 0.07 | 0.05 |

As apparent from Table 4, the sample prepared with the combined use of the dyes of the present invention showed no such dyed stain due to the residual dye as recognized in the sample containing the known dyes, and thus the dyes of the present invention were found out to be particularly excellent in decoloring nature.

What is claimed is:

1. A silver halide photographic light-sensitive material comprising a support and a layer containing an oxonol dye represented by the following formula (1)

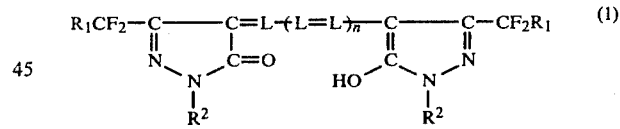

wherein $R_1$ is a hydrogen atom, fluorine atom, or a fluorinated alkyl group having from 1 to 4 carbon atoms; $R_2$ is hydrogen, a substituted or unsubstituted alkyl group, or a substituted or unsubstituted aryl group; n is an integer of 0, 1 or 2; and L is methine group which may be substituted.

2. A silver halide photographic light-sensitive material according to claim 1, wherein $R_1$ in the formula (1) is a fluorine atom.

3. A silver halide photographic light-sensitive material according to claim 1 or 2, wherein $R_2$ in the formula (1) is substituted phenyl group.

4. A silver halide photographic light-sensitive material according to claim 3, $R_2$ in the formula (1) is a phenyl group substituted by a carboxy or sulfo group or a salt thereof.

* * * * *